(12) United States Patent
Canavesi et al.

(10) Patent No.: US 11,094,064 B2
(45) Date of Patent: Aug. 17, 2021

(54) THREE DIMENSIONAL CORNEAL IMAGING WITH GABOR-DOMAIN OPTICAL COHERENCE MICROSCOPY

(71) Applicant: LighTopTech Corp., West Henrietta, NY (US)

(72) Inventors: Cristina Canavesi, W Henrietta, NY (US); Andrea Cogliati, W Henrietta, NY (US)

(73) Assignee: LighTopTech Corp., West Henrietta, NY (US)

( * ) Notice: Subject to any disclaimer, the term of this patent is extended or adjusted under 35 U.S.C. 154(b) by 0 days.

(21) Appl. No.: 16/825,196

(22) Filed: Mar. 20, 2020

(65) Prior Publication Data

US 2020/0302607 A1 Sep. 24, 2020

Related U.S. Application Data

(60) Provisional application No. 62/822,406, filed on Mar. 22, 2019.

(51) Int. Cl.
| | |
|---|---|
| *G06K 9/00* | (2006.01) |
| *G06T 7/00* | (2017.01) |
| *G06T 11/00* | (2006.01) |

(52) U.S. Cl.
CPC .......... *G06T 7/0014* (2013.01); *G06T 11/008* (2013.01); *G06T 2207/10028* (2013.01); *G06T 2207/20032* (2013.01); *G06T 2207/20081* (2013.01); *G06T 2207/30041* (2013.01)

(58) Field of Classification Search
None
See application file for complete search history.

(56) References Cited

U.S. PATENT DOCUMENTS

| | | | |
|---|---|---|---|
| 8,879,813 B1* | 11/2014 | Solanki | A61B 3/14 382/128 |
| 10,041,865 B2 | 8/2018 | Tran | |
| 2011/0034803 A1* | 2/2011 | Stetson | G06T 7/0012 600/425 |
| 2019/0209006 A1* | 7/2019 | Abou Shousha | A61B 3/1005 |
| 2019/0274542 A1* | 9/2019 | Imamura | G06T 7/0012 |

OTHER PUBLICATIONS

Huang, Liang-Kai et al., "Image Thresholding by Minimizing the Measures of Fuzziness", Pergamon, Pattern Recognition, vol. 28, No. 1, pp. 41-51, 1995, 1995 Pattern Recognition Society, Pub. 0031-3203/95.,Elsevier Science Ltd., Printed in Great Britain.

* cited by examiner

*Primary Examiner* — Atiba O Fitzpatrick
(74) *Attorney, Agent, or Firm* — Brian B. Shaw, Esq.; Harter Secrest & Emery LLLP

(57) ABSTRACT

A system for non-contact imaging of corneal tissue stored in a viewing chamber using Gabor-domain optical coherence microscopy (GDOCM), wherein a 3D numerical flattening procedure is applied to the image data to produce an at least substantially artifact-free en face view of the endothelium.

21 Claims, 13 Drawing Sheets

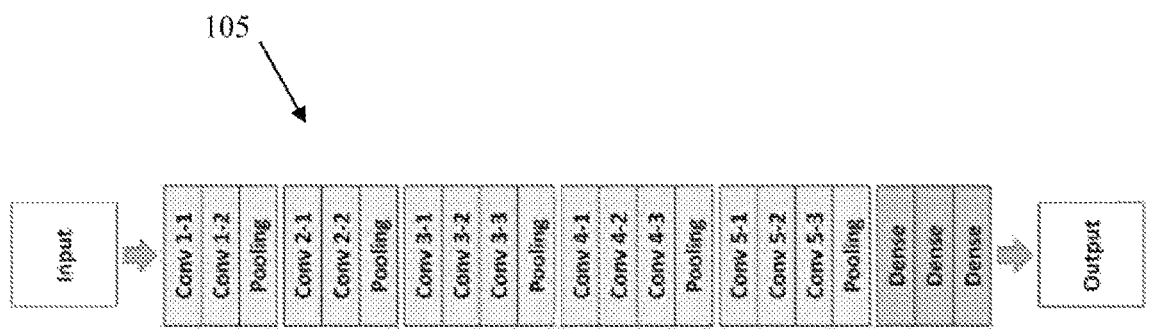
FIGURE 10
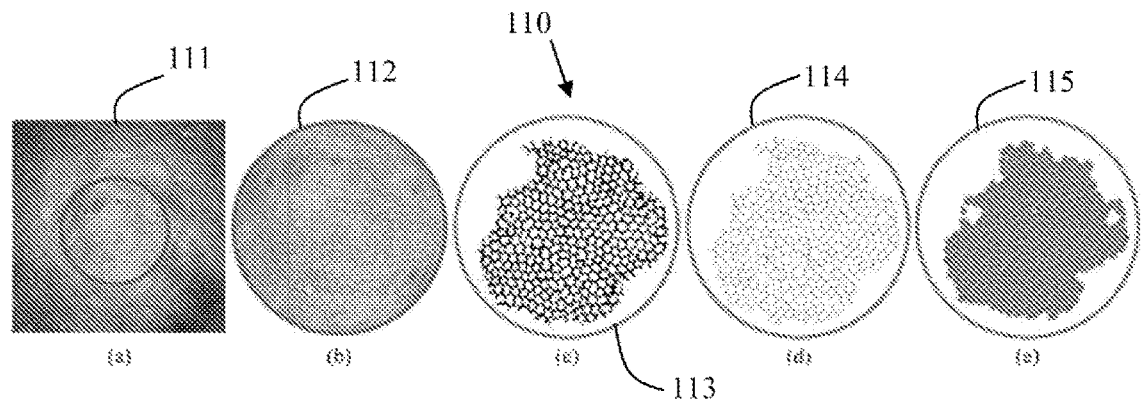
FIGURE 11
FIGURE 12
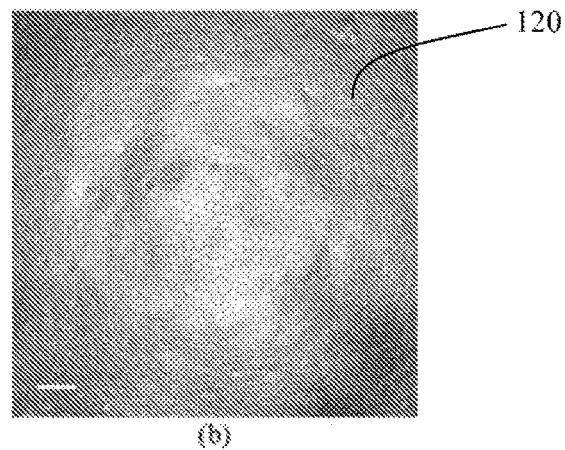

FIGURE 16
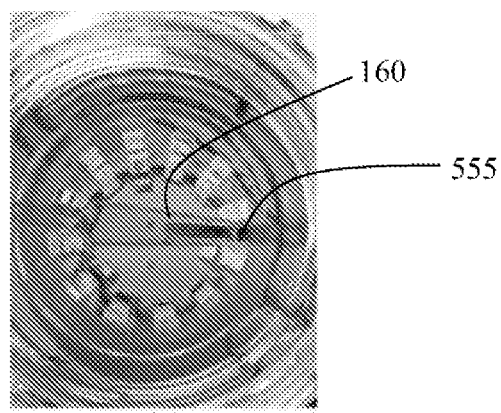
FIGURE 17
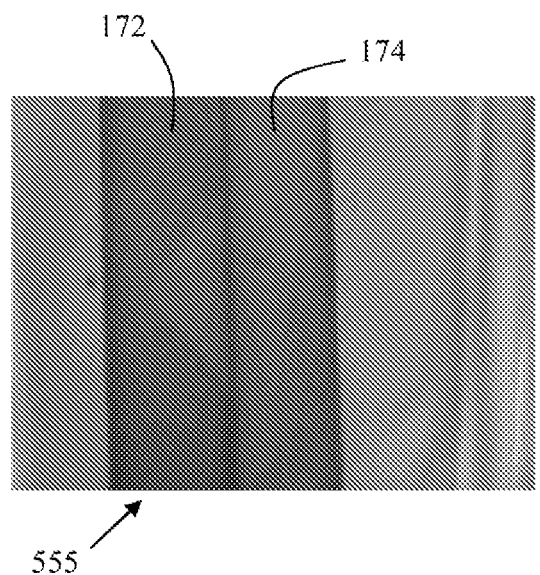
FIGURE 18

THREE DIMENSIONAL CORNEAL IMAGING WITH GABOR-DOMAIN OPTICAL COHERENCE MICROSCOPY

CROSS-REFERENCE TO RELATED APPLICATIONS

This application claims the benefit of U.S. Provisional patent application 62/822,406 filed Mar. 22, 2019 entitled OPTICAL AND NUMERICAL METHODS FOR MICROSCOPIC TISSUE ANALYSIS.

STATEMENT REGARDING FEDERALLY SPONSORED RESEARCH OR DEVELOPMENT

This invention was made with government support under Grant Number: 1R43EY028827-01, awarded by NIH National Eye Institute, and Grant No. IIP-1534701, awarded by the National Science Foundation. The government has certain rights in the invention.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Eye banks typically conduct three main exams to qualify of corneal tissue: (i) evaluation of stromal opacity; (ii) pachymetry; and (iii) assessment of endothelial cell density and morphology.

The evaluation of stromal opacity is usually done with slit lamp microscopy. The pachymetry is typically performed with ultrasound, to measure the center thickness. Optical coherence tomography (OCT) has been shown to be comparable to ultrasound, while specular microscopy has been determined to be insufficiently accurate. In the assessment of endothelial cell density and morphology, the evaluation is typically done with specular microscopy. However, in specular microscopy: (1) the viewing is restricted to a single cell layer, thus requiring additional methods to fully evaluate the corneal tissue, and (2) the field of view is restricted to a small region in the center of the cornea (typically 0.12 $mm^2$). These limits from specular microscopy may cause undersampling. Subsequently, the actual cell counting is typically performed manually, which introduces an associated subjectivity and error.

Further, endothelial cells show poor regenerative capacity in vivo and are critical for preserving corneal transparency vis-a-vis their fluid pumping mechanism that maintains appropriate hydration status and clarity of the stroma. The ability to assess corneal endothelial function is limited, so a surrogate is often used. In one case, the surrogate for corneal endothelial health is an evaluation of endothelial cell density (ECD). The Eye Bank Association of America (EBAA) employs ECD as a medical standard for assessing tissue. Most eye banks indicate 2,000 cells/$mm^2$ as the minimum ECD requirement for penetrating keratoplasty, however surgeons commonly request and prefer higher ECDs (e.g., above 2,300-2,500 cells/$mm^2$). Quantitative assessments of (ECD) and morphology with specular microscopy are performed at eye banks to evaluate donor tissue quality. To minimize risk of corneal donor tissue contamination, specular microscopy is performed with the donor corneal tissue immersed in a preserving medium, such as commercially available Optisol GS or Life 4° C. within a PMMA (polymethyl methacrylate) storage and viewing chamber (such as commercially available form Bausch+Lomb, Krolman, Stephens or Numedis). This immersion further leads to inaccuracies.

Additionally, 6-month post-operative ECD can be an important metric to predict endothelial graft failure after penetrating keratoplasty. Prior methods lack sufficient robustness to deal with images of varying quality, as they are prone to under- and over-segmentation in regions with poor image quality.

Therefore, the need exists for system and method of reducing the complexity of qualification of tissue, and particularly endothelial cells, wherein the trustworthiness of the data is increased.

BRIEF SUMMARY OF THE INVENTION

The present disclosure is directed to enhancing the accuracy of and reducing bias in cell quantification and particularly endothelial cell density (ECD) quantification by providing Gabor-domain optical coherence microscopy (GDOCM) for three dimensional (3D) wide field of view (1 $mm^2$) corneal imaging and machine learning for automatic delineation of endothelial cell boundaries.

In one configuration, human corneas stored in viewing chambers can be non-contact imaged over a wide field-of-view with GDOCM. Numerical methods are applied to compensate for the natural curvature of the cornea and produce an image of the flattened endothelium. A trained convolutional neural network (CNN) automatically delineates the cell boundaries.

Generally, the present disclosure provides a method of imaging a tissue sample, including the steps of imaging, by contact imaging or non-contact imaging, a portion of the tissue sample to create image data; applying a low pass filter to the image data to create a first filtered data; thresholding the first filtered data to create thresholded data; median filtering the thresholded data to reduce thresholding artifacts; automatically identifying target cell structures through iterative machine processing to reduce outliers to define a fitted surface; and adjusting an intensity projection of a slice adjacent the fitted surface to accommodate errors introduced by at least one of (i) the image thresholding and (ii) median filtering to provide substantially artifact free en face view of the portion of the tissue sample.

In one configuration, an apparatus is provided for imaging a tissue sample, the apparatus including a Gabor-domain optical coherence microscope (GDOCM) configured for imaging, by contact imaging or non-contact imaging, of a portion of the tissue sample; and a processor connected to the GDOCM, the processor configured to (i) apply a low pass filter to the image data to create a first filtered data; (ii) threshold the first filtered data to create thresholded data; (iii) median filter the thresholded data to reduce thresholding artifacts; (iv) automatically identify target structures through iterative machine processing to reduce outliers to define a fitted surface; and (v) adjust an intensity projection of a slice adjacent the fitted surface to accommodate errors introduced by at least one of (aa) the image thresholding and (bb) median filtering to provide a substantially artifact free en face view of the portion of the tissue.

The present disclosure further contemplates a method of assessing tissue graft efficacy, including the steps of in vivo imaging, by contact imaging or non-contact imaging, a grafted tissue with a Gabor-domain optical coherence microscope; applying a low pass filter to the image data to create a first filtered data; thresholding the first filtered data to create thresholded data; median filtering the thresholded data to reduce thresholding artifacts; automatically identifying target cells through iterative machine processing to reduce outliers to define a fitted surface; and adjusting an intensity projection of a slice adjacent the fitted surface to accommodate errors introduced by at least one of (aa) the image thresholding and (bb) median filtering to provide a substantially artifact free en face view of the grafter tissue.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

Figure 5:
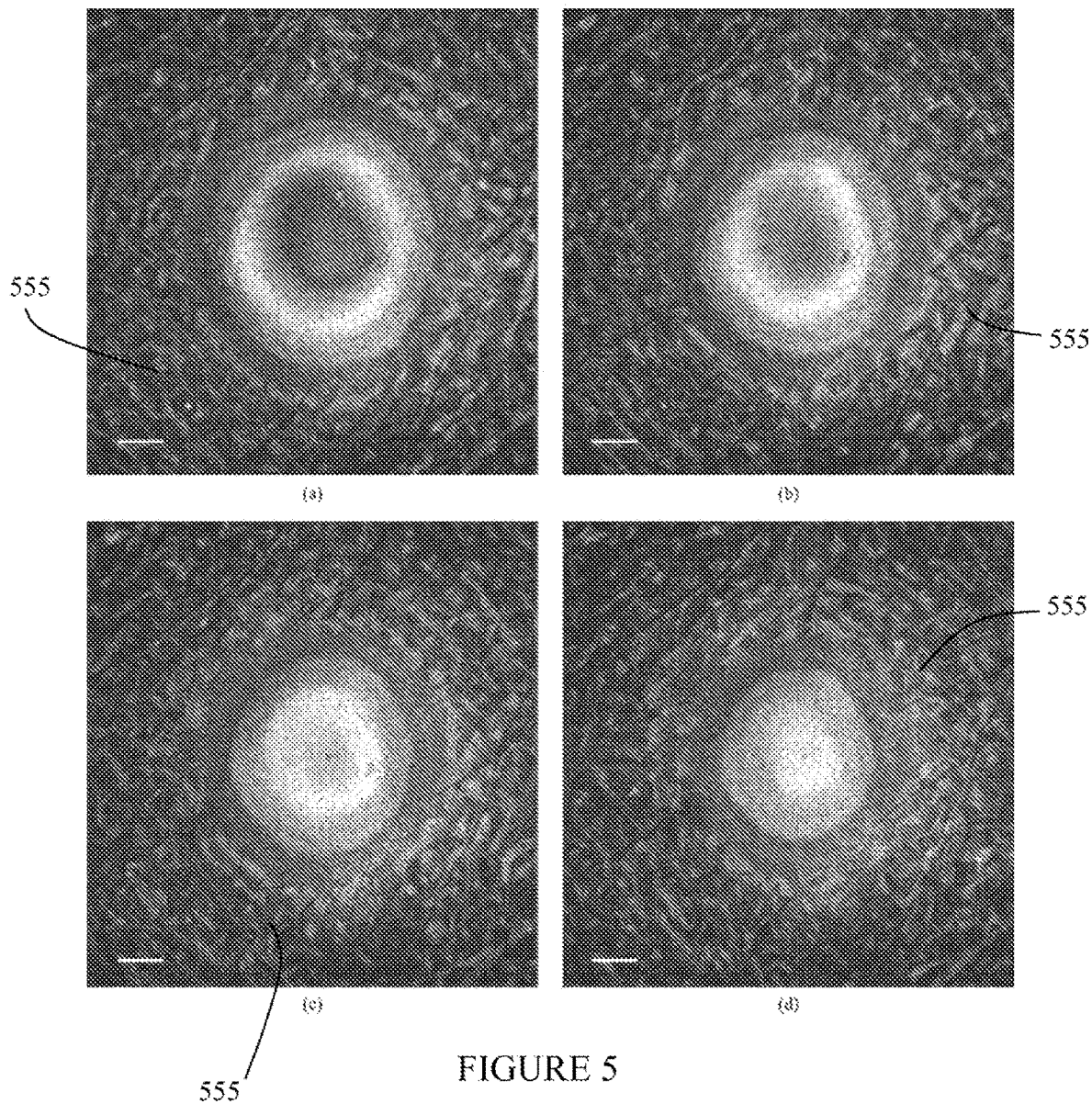

FIG. 5 includes representative images acquired by GDOCM showing the impact of the curvature of the specimen and specifically curvature of the endothelium.

Figure 6:
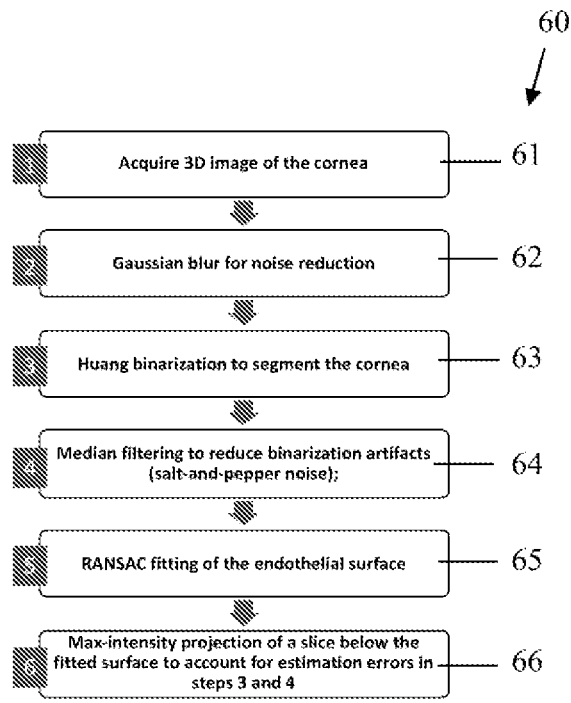

FIG. 6 is a flow chart of steps in one configuration of the numerical methods.

Figure 7:
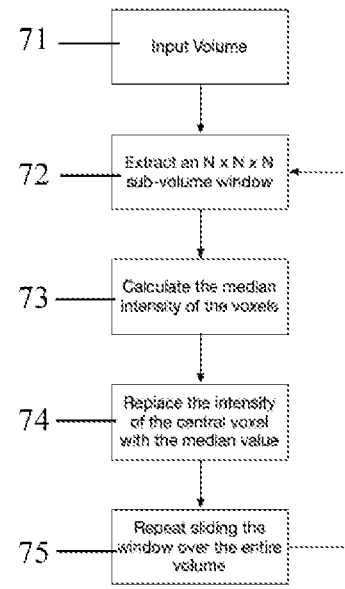

FIG. 7 is flow chart of median filter. N is the size of the window.

Figure 8:
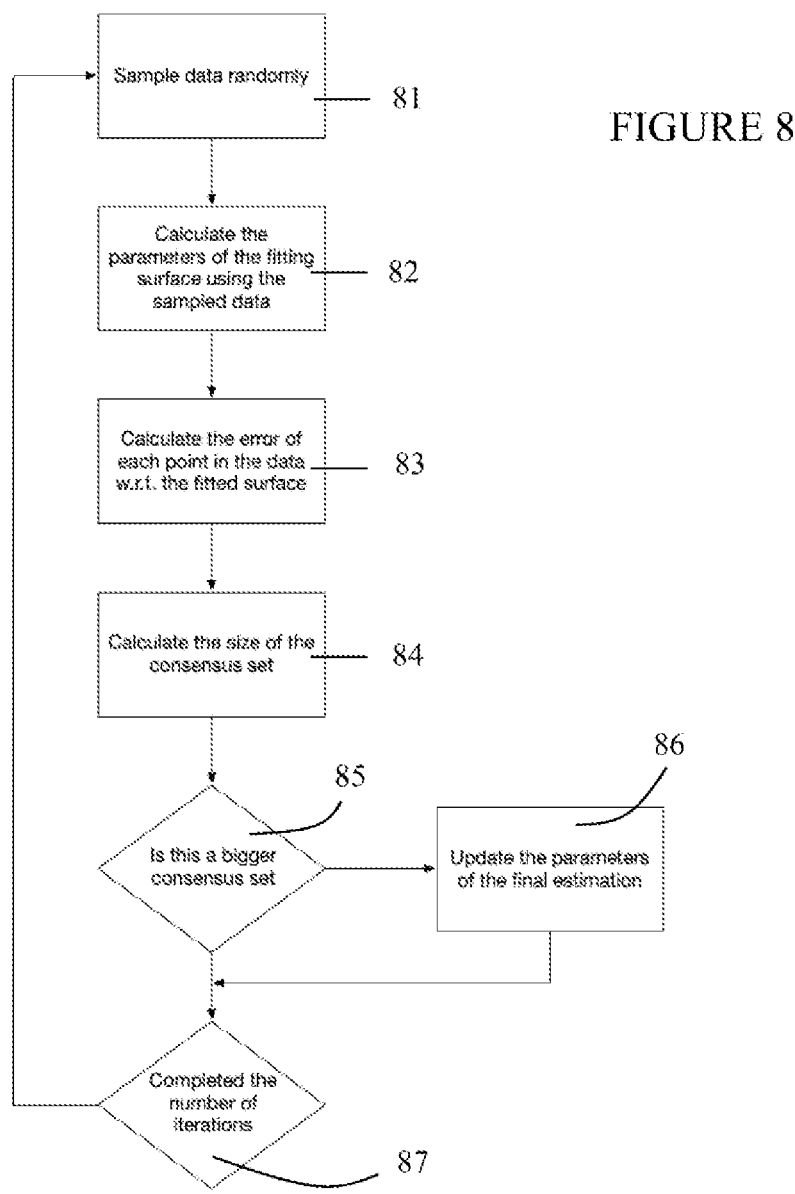

FIG. 8 is flow chart of RANSAC algorithm.

Figure 9:
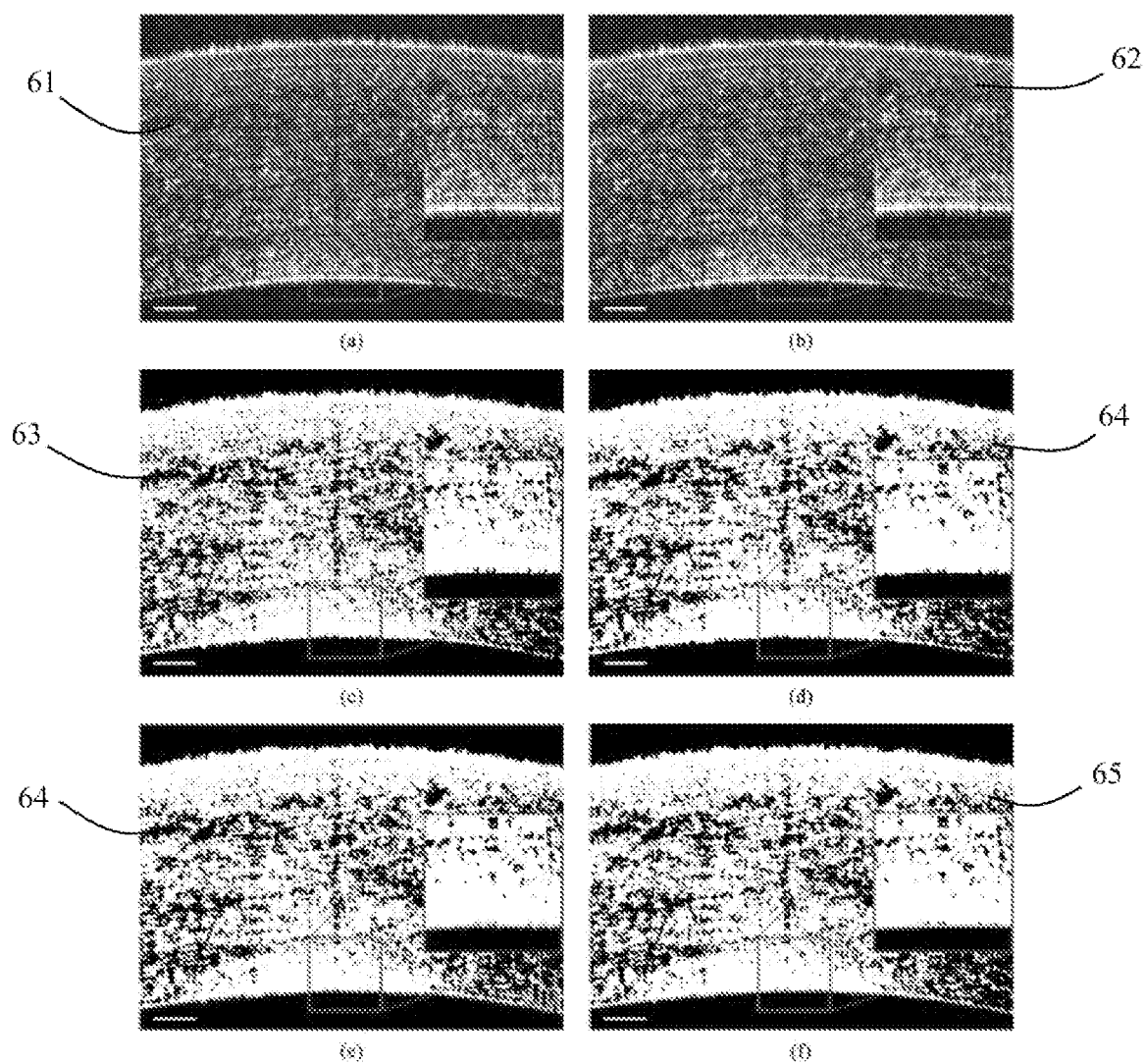

FIG. 9 includes images of the present automated segmentation of the endothelium from a GDOCM image shown in a 2D cross-section.

FIG. 10 is a representative of the architecture used for automated endothelial cell segmentation.

FIG. 11 is a representative automated cell counting procedure.

FIG. 12 is an en face view of the endothelium resulting from the present system.

Figure 13:
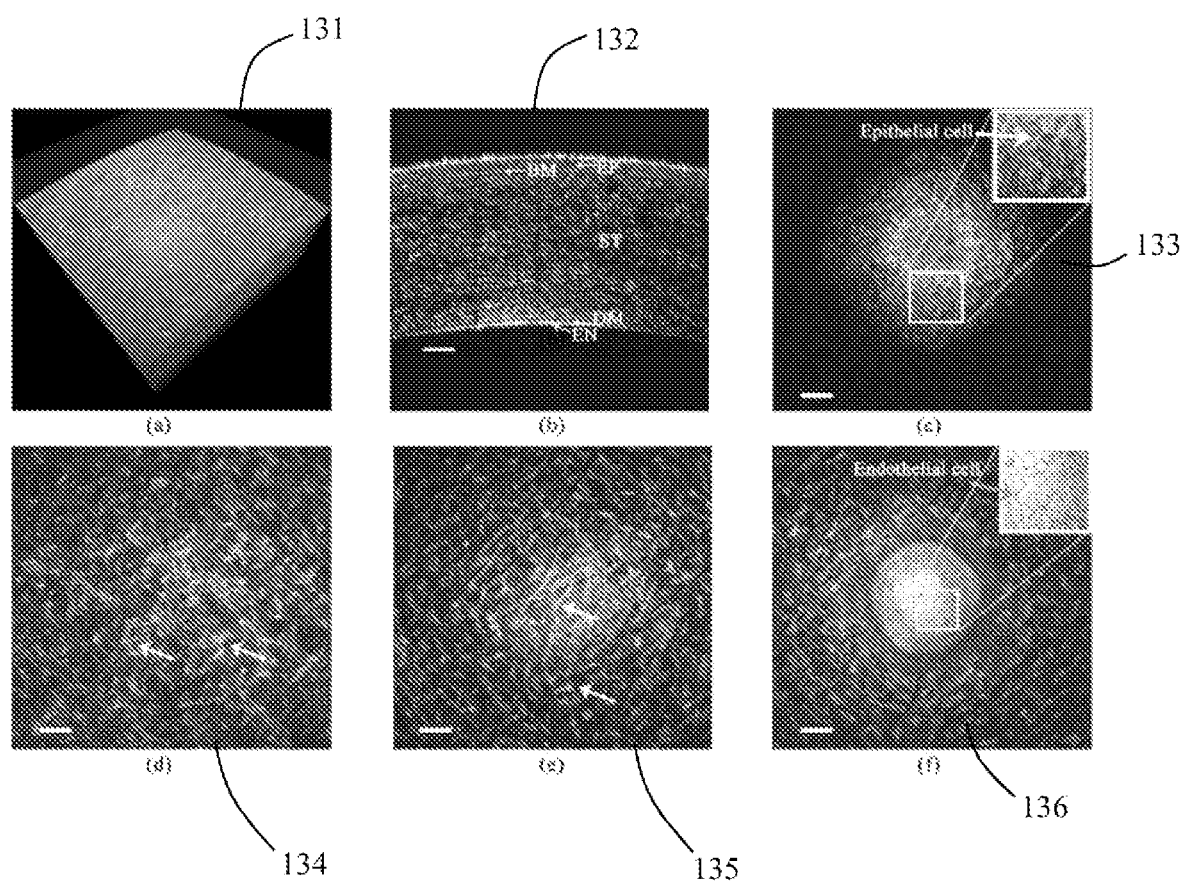

FIG. 13 is a plurality of images resulting from the present system of an ex vivo human cornea (field of view 1 mm$^2$) imaged through the viewing chamber.

Figure 14:
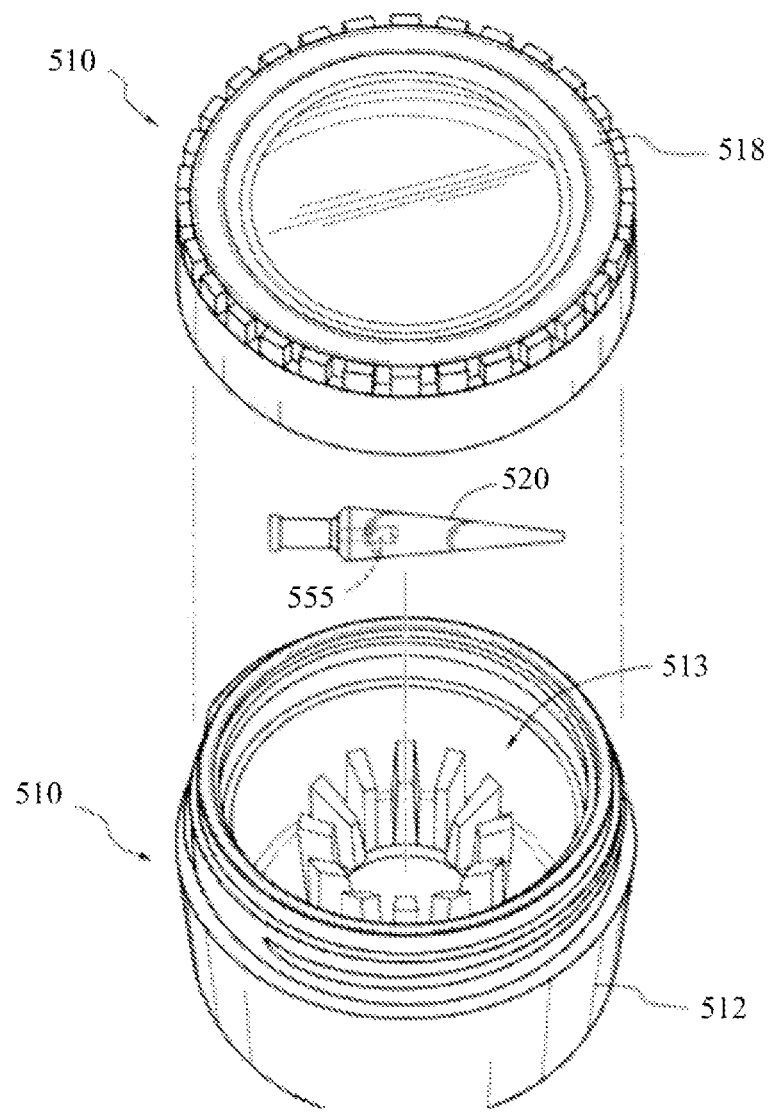

FIG. 14 is a perspective view of a representative container for retaining processed tissue, wherein the processed tissue can be imaged by the present system.

Figure 15:
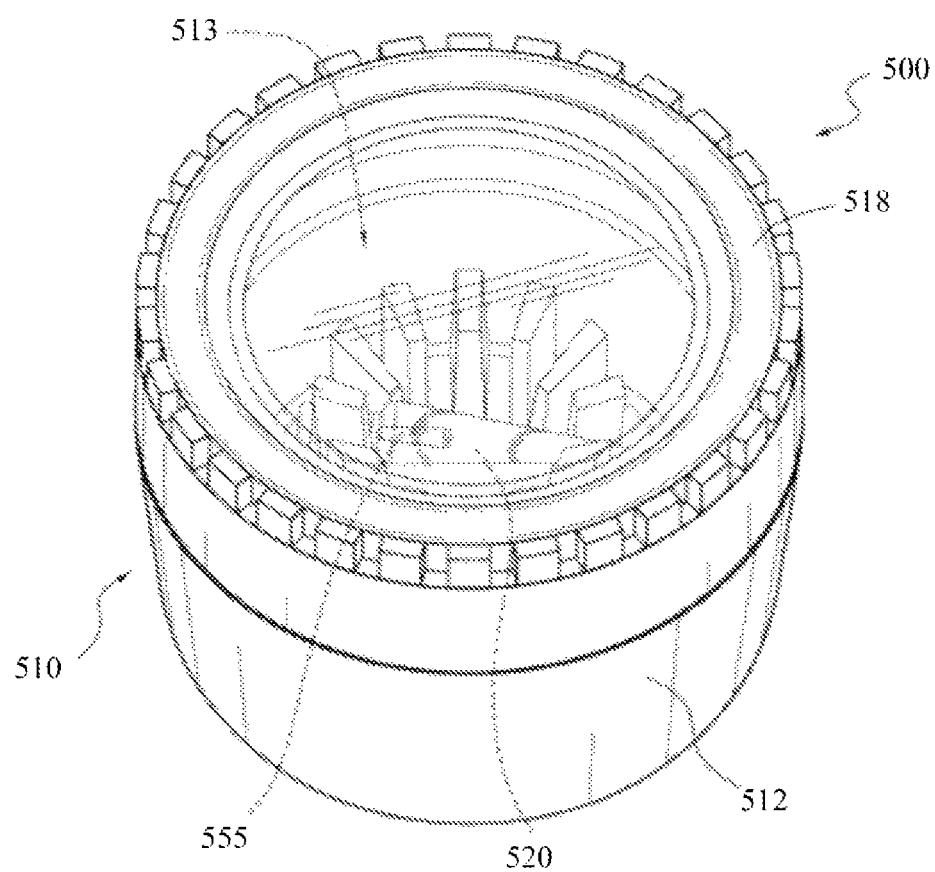

FIG. 15 is a perspective view of the representative container of FIG. 14 in a closed configuration.

FIG. 16 is a plan view of a tissue scroll in a tube for imaging by the present system.

FIG. 17 is a dual scroll configuration of tissue to be imaged by the present system.

FIG. 18 is a montage of two adjacent 3D images to cover a full width of a dual scroll.

Figure 19:
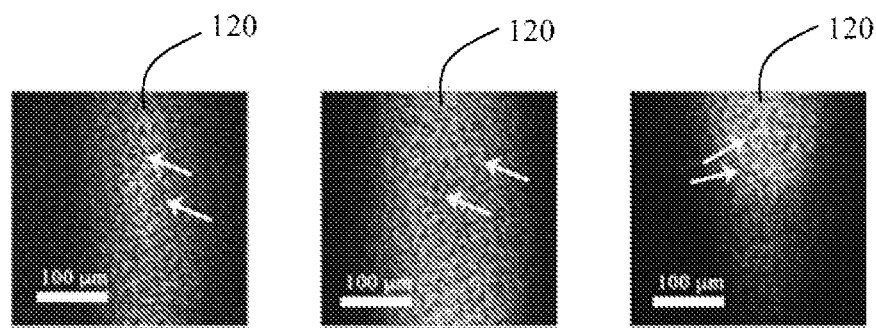

FIG. 19 shows panels of images from the present system with the endothelial cells identified with arrows.

Figure 20:
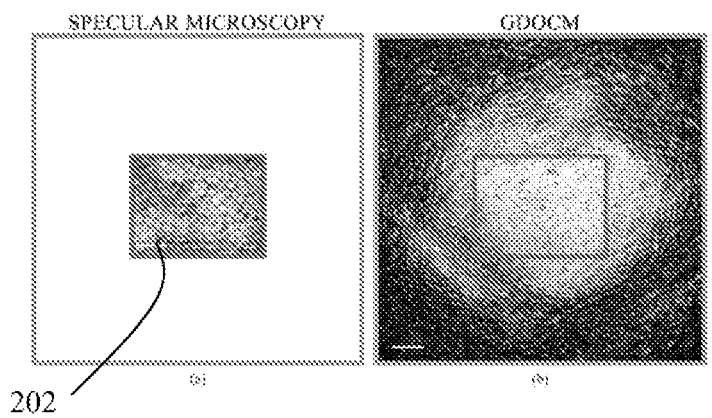

FIG. 20 is a comparison of imaging with specular microscopy (SM) to the present GDOCM imaging.

Figure 21:
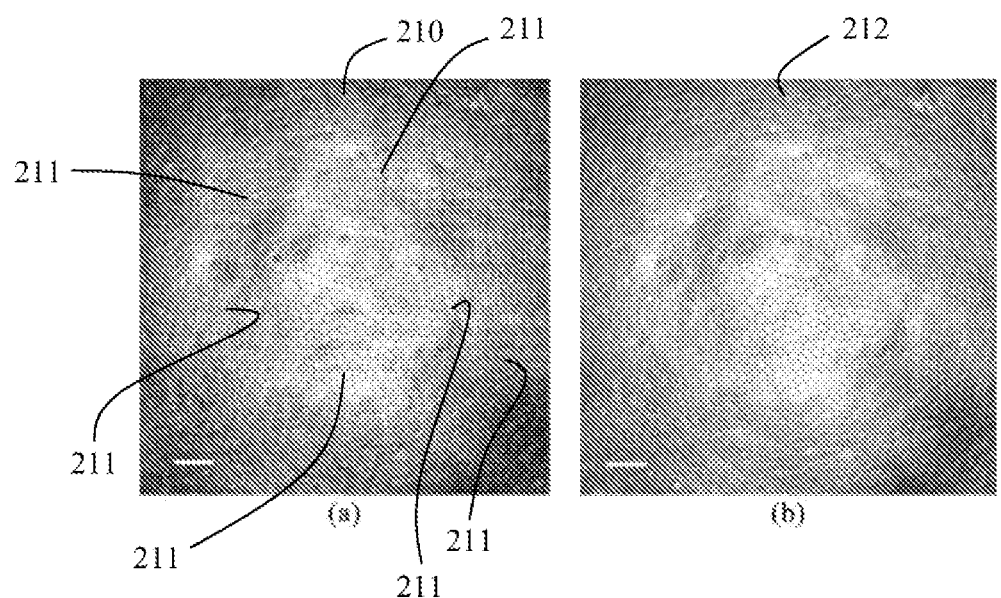

FIG. 21 shows an en face image of a portion of the endothelium comparing a 1 dimension approach to the present 3 dimension approach.

DETAILED DESCRIPTION OF THE INVENTION

The present system provides for non-contact imaging of tissue, such as corneal tissue, through a viewing chamber with Gabor-domain optical coherence microscopy (GDOCM) over a larger field-of-view than specular microscopy (SM). A three dimensional (3D) image processing algorithm is applied to segment the endothelium and correct the corneal curvature (nonplanar orientation of the cells), resulting in artifact-free images of the flattened endothelium.

Although the present description is set forth in terms of tissue that includes corneal endothelial cells, it is understood the tissue can includes retinal cell mosaics, such as photoreceptors, retinal pigment epithelium (RPE) cells, or any other suitable cells. Further, it is understood that images of the tissue may be acquired ex vivo, in vivo, or in vitro.

Figure 1:
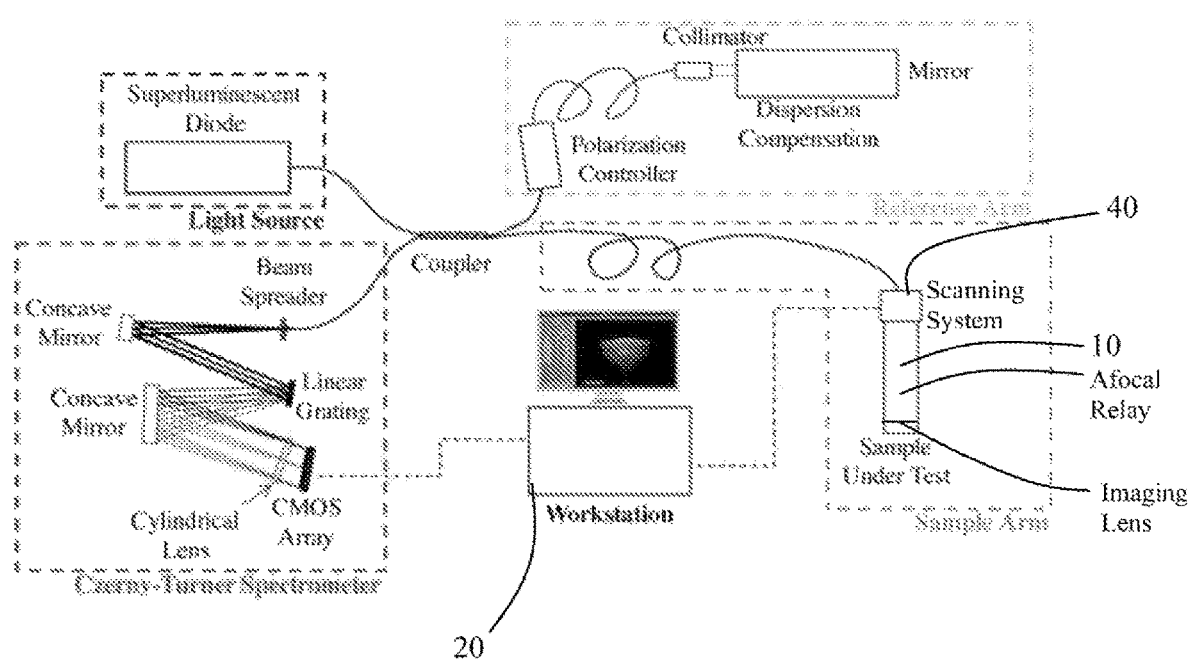
FIG. 1 is a schematic of a GDOCM system.

Referring to FIG. 1, the present system includes a microscope 10 for generating image data and a workstation or controller 20 for processing the acquired image data. It is understood the controller 20 can also be configured to direct the operation of the microscope 10 for imaging the sample and generating the image data. The controller 20 can include or access a processer programmed with the equations set forth herein to process the data. The controller 20 can be a dedicated controller to the present system or can be a component of a larger imaging system.

Figure 2:
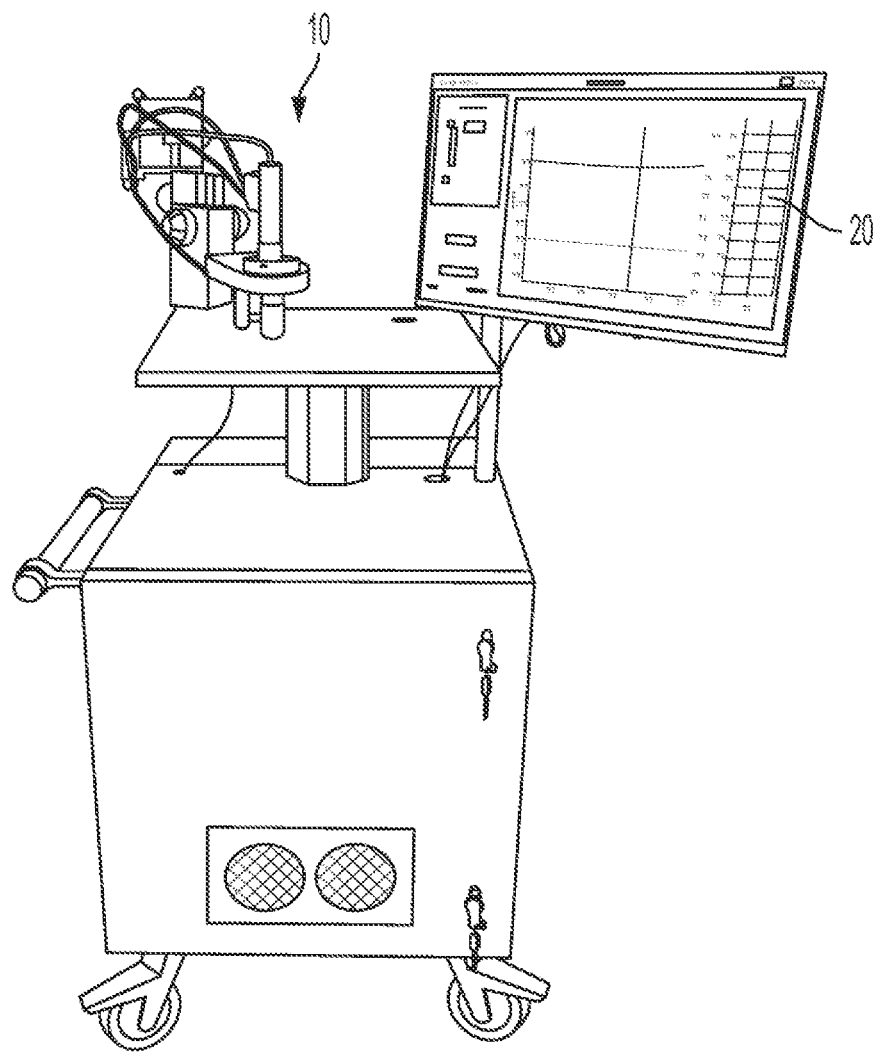
FIG. 2 is a representative GDOCM system.
Figure 3:
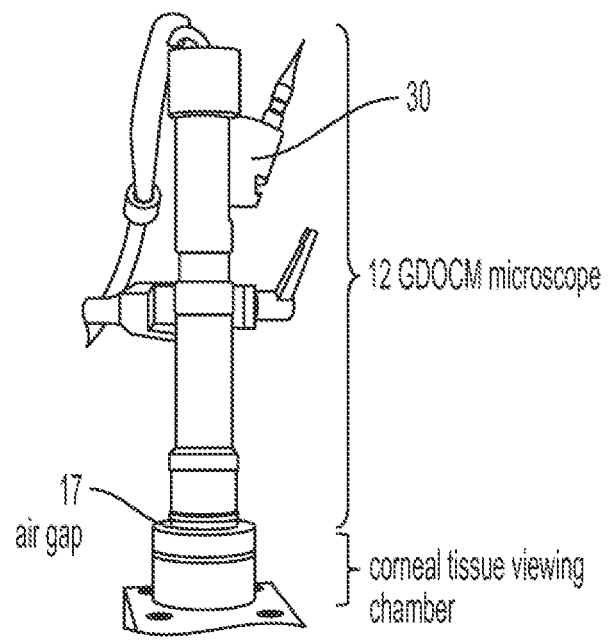
FIG. 3 is the representative GDOCM system of FIG. 1 showing the GDOCM microscope operating at 15 mm working distance to image corneal tissue through a viewing chamber, wherein an air gap exists between the GDOCM microscope and the viewing chamber.

Referring to FIGS. 2 and 3, in one configuration, the microscope 10 is an optical coherence microscope and in a further configuration a Gabor-domain optical coherence microscopy (GDOCM) microscope 12.

GDOCM is a high lateral resolution variant of Fourier-domain optical coherence tomography (OCT). GDOCM incorporates concepts of OCT (imaging depth of 2-3 mm) and confocal microscopy (micron scale lateral resolution). GDOCM exceeds the cellular resolution limit of OCT by incorporating a liquid lens in a microscope with 0.18 numerical aperture (corresponding to a lateral resolution of 2 μm), which is used to dynamically refocus the beam at different depths.

The GDOCM system can be a modified system from that shown in U.S. Pat. No. 8,340,455 entitled Systems And Methods For Performing Gabor-Domain Optical Coherence Microscopy issuing Dec. 25, 2012 herein expressly incorporated by reference and U.S. Pat. No. 8,184,365 entitled Optical Instruments Having Dynamic Focus issuing May 22, 2012 herein expressly incorporated by reference.

Figure 4:
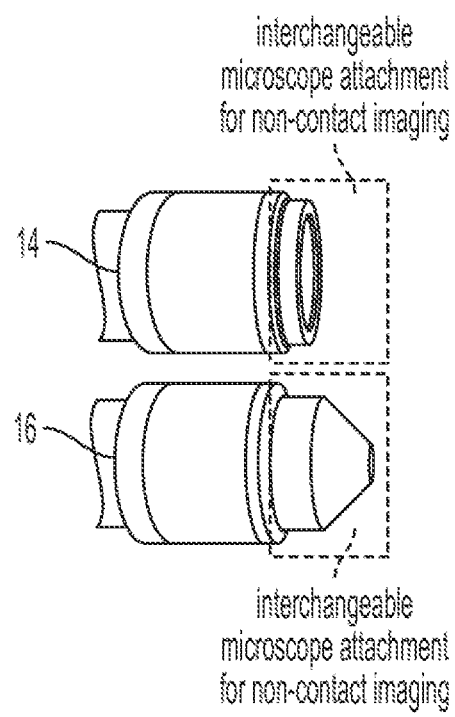
FIG. 4 is the representative GDOCM system of FIG. 1 showing the interchangeable end part of the GDOCM microscope used to switch between the contact and contact-less (with 15 mm working distance) operations.

Referring to FIG. 3 and to FIG. 4, the GDOCM microscope 12 is modified to support two imaging modalities: contact, and non-contact with a 15 mm working distance. That is, for non-contact imaging, the GDOCM microscope has a working distance greater than 0.0 mm, wherein the working distance is the distance from the front lens element of the objective to the closest surface of the specimen, or tissue sample.

The GDOCM system includes a camera 30 to visualize the area being imaged and aid in alignment; optional illumination for the aiming camera (typically provided with LEDs); a removable objective 14, 16 to switch between contact and non-contact modalities. The camera 30 generally operates in the visible spectrum and can be coupled to the light path using a dichroic beam splitter.

These modifications provide the GDOCM system in FIG. 1 to image corneal tissue 555 stored in viewing chambers 510 (seen in FIGS. 14 and 15) using a non-contact imaging modality across an airgap 17, as shown in FIG. 3, and in select configurations provide an operating working distance of 15 mm. Thus, the GDOCM system provides non-contact imaging with a 15 mm working distance to image corneal tissue 555 through a viewing chamber 510, wherein an airgap 17 can exist between the microscope 10 and the viewing chamber.

In one configuration, a MEMS (microelectromechanical systems) mirror 40, as shown in FIG. 1, is used to steer a beam of the selected light source over a field of view of 1 mm×1 mm. A superluminescent diode centered at 840 nm with a FWHM (full width half maximum) bandwidth of 100 nm is used as the light source to produce an axial resolution <3 µm. The GDOCM system can have an imaging depth of 2-3 mm, with axial resolution <3 µm (and can be between 1 µm and 2 µm) with a lateral resolution of 2 µm. Thus, the focal point of the GDOCM system can be moved along an X-Y plane and also along a Z axis to allow imaging of spaced planes.

Referring to FIG. 5, 3D corneal images acquired by GDOCM are affected by the curvature of the tissue sample 555, such as the endothelium. As a consequence, it is not possible to visualize the endothelial cell layer in a single en face image, as illustrated by FIG. 5.

Possible image distortions introduced by the presence of the viewing chamber 510 can either be compensated for in the optical design of the microscope 10 or be corrected with image processing and by calibrating the image with targets of known dimensions.

Adjacent en face views in a 3D GDOCM image are separated by ~1.5 µm, which corresponds to the axial sectioning capability of the system. The en face images shown in FIG. 5(a-d) span a total depth of 9 µm and are each separated by ~3 µm; it can be seen that only a fraction of the total endothelial cells is visible in each image. Additionally, cells at the center of the cornea are brighter than at the periphery, since there is some loss of light at the periphery due to the natural curvature of the cornea causing some of the backscattered light not to be collected by the microscope. As such, the effective area considered in the analysis was 0.2 mm², corresponding to the central portion of the cornea with a diameter of 0.5 mm. It should be noted that this constitutes a significant improvement (6-12×) in the number of cells counted over the current practice which consists of eye bank technicians manually counting only a total of 50-100 cells within the 0.12 mm² area imaged with spectral microscopy.

Previous flattening attempts of GDOCM images include detecting the peak in each A-scan (1D depth profile) and repeating this step to the entire volumetric image to extract the endothelial surface; after polynomial fitting, the pixels of the 3D image were shifted to produce a flattened view of the endothelium. The drawback of this prior approach is that artifacts are often present in the flattened image due to the 1D approach of this method.

Generally, in the present system, the acquired image data from the GDOCM 12 is processed through the application of numerical methods, wherein the numerical methods digitally flatten the endothelium in a 3D GDOCM image.

As seen in FIG. 6, in the present system, the numerical flattening 60 to produce a 3D result includes acquiring the 3D image of the tissue, such as the cornea, from the GDOCM 12 at step 61 and the steps of (i) applying a low pass filter to the image data at step 62; (ii) thresholding the filtered data at step 63; (iii) median filtering the thresholded data at step 64; (iv) identifying the cell surface from the median filtered data at step 65 and (v) maximum intensity projection of a slice adjacent, such as below, the identified (fitted) cell surface at step 66.

Step (i) at 62—applying a low pass filter to the acquired image data to reduce noise. In one configuration, the low pass filter is a Gaussian blur (or smoothing) that creates a first filtered data. The Gaussian blur can be expressed in two dimensions as $$G(x, y) = \frac{1}{2\pi\sigma^2} e^{-\frac{x^2+y^2}{2\sigma^2}},$$

or in three dimensions as $$G(x, y, z) = \frac{1}{2\pi\sigma^2} e^{-\frac{x^2+y^2+z^2}{2\sigma^2}}$$

to generate the first filtered data. That is, denoising can be imparted by a low pass filter in the implementation of a Gaussian function.

Step (ii) at step 63—thresholding is applied to the first filtered data. In one configuration, the thresholding is accomplished with Huang binarization. It has been found advantageous for the acquired volume should be bimodal, i.e., have bright voxels over the entire cornea and dark voxels elsewhere. However, in practice it has been found, the volume is still noisy, even after denoising. Ideally, the Huang binarization attempts to find the optimal binarization threshold by minimizing the fuzziness of the image. The Huang binarization is generally set forth in *Image Thresholding By Minimizing The Measures Of Fuzziness*, by Liang-Kai Huang and Mao-Jiun J. Wang of the Department of Industrial Engineering, National Tsing Hua University, Hsinchu, Taiwan 300, R.O.C. (Received 13 Aug. 1993; in revised form 22 Feb. 1994; received for publication 20 Apr. 1994) as published in *Pattern Recognition*, Vol. 28, No. 1, pp. 41-51, 1995 Elsevier Science Ltd Copyright © 1995 Pattern Recognition Society Printed in Great Britain. Generally, the Huang binarization is based on the concept of fuzzy sets and the definition of membership function. It utilizes the measures of fuzziness of an input image to identify the appropriate threshold value.

Step (iii) at step 64—median filtering to reduce binarization artifacts. Binarization can increase the noise in the image, especially the so-called salt-and-pepper noise. Median filtering as known in the art can be applied to reduce this type of noise. The procedure is detailed in the flow chart of FIG. 7. Referring to FIG. 7, the steps include acquiring the input volume at 71; extracting an N×N×N sub-volume window at 72; calculating the median intensity across the voxels at 73; replacing the intensity of the central voxel (considered voxel) with the median value at 74 and repeat the sliding of the window over the entire volume at 75.

Generally, the median filter considers each pixel in the image in turn and the examines the neighboring pixels to determine whether the considered pixel is representative of its surroundings. The median filter replaces a pixel value of the considered pixel with the median of the neighboring pixel values. The median is calculated by first sorting all the pixel values from the surrounding neighborhood into numerical order and then replacing the examined pixel with the middle pixel value. That is, the median filter processes through the signal entry by entry, replacing each entry with the median of neighboring entries. The pattern of neighbors is called the "window," which slides, entry by entry, over the entire signal. For 2D (or higher-dimensional) data, the window includes all entries within a given radius or ellipsoidal region of the entry (pixel) of interest.

Step (iv) at step 65—identifying (fitting) the cell surface. In one configuration, the endothelial surface is identified with random sample consensus (RANSAC) fitting, as in FIG. 8. Referring to FIG. 8, the cell fitting includes the steps of randomly sampling the data at 81; then calculating parameters of the fitting surface using the sampled data at 82, then calculating an error of each point in the data with respect to the fitted surface at 83; then calculating the size of the consensus set at 84; then a decision point is applied at 85 based on whether the resulting consensus set is bigger; such that either the parameters of the final estimation are updated at 86 or the number of iterations is complete at 87 and a new sample is subsequently selected.

While the present disclosure is set forth in terms of RANSAC fitting, it is understood other algorithms can be employed to fit a 2D surface using the binarization. If the fitting is consistent with the expected curvature, this initial estimate may be used to iteratively inform the binarization of concentric cylindrical slices (the signal-to-noise ratio is generally homogeneous at the same axial distance). Alternatively, if the binarization is exceedingly distant from the initial estimate, the binarization threshold may be adjusted accordingly.

Step (v) at step 66—maximum intensity projection of a slice adjacent, such as below the fitted surface, to account for estimation errors in steps (ii) and (iii). The outcome of the 3D flattening approach is an artifact-free en face view of the endothelium.

$$I_P(x, y) = \max_{S_F(x,y)-Z_S < z < S_F(x,y)} I(x, y, z),$$

where $I_p(x,y)$ is the artifact-free en face view, $I(x,y,z)$ is the intensity of each voxel, $Z_S$ is the size of the slice, and $S_F(x,y)$ is the fitted surface found in Step 4.

Referring to FIG. 9, images of the present automated segmentation of the endothelium from a GDOCM image shown in a 2D cross-section. In FIG. 9, frame (a) is the original image; frame (b) is after a Gaussian blur (Step (i) 62) of low pass filter; frame (c) is after thresholding, such as Huang binarization (Step (ii) 63); frame (d) is after median filtering (Step (iii) 64); frames (e, f) show the segmented endothelial surface in green before (e) and after (f) RANSAC fitting (Step (iv) 65). It is noted the bars in FIG. 9 are 100 μm.

In one configuration, a dataset with 180 GDOCM images, and the corresponding manual tracing of the endothelial cells over the central 0.5 mm diameter of the flattened endothelium was used for training and testing a convolutional neural network (CNN)—VGG-16 as set forth in FIG. 10.

Referring FIG. 10, VGG-16 architecture 105 can be used for automated endothelial cell segmentation. VGG-16 is a type of convolutional neural network (CNN). CNNs also called shift invariant artificial neural networks (SIANN), are a type of artificial neural networks specially designed for image processing and modeled after the visual cortex of animals. The convolutional layers (denoted by the prefix Cony in the figure) mimic the functions of visual receptors, while the pooling layers filter the most salient activations from the lower layers. Dense layers are regular fully connected multi-layer perceptrons, used for classification.

A transfer learning approach is employed by using the pre-trained VGG-16 network. The network is pre-trained on more than a million images from the ImageNet database. The pre-trained model has already learned to extract features from different image categories and can improve the classification results even with small training datasets. Data augmentation can be by applying randomly distributed translations of ±10 pixels in both directions, specular reflections, and rotations. Scaling and skewing were not applied to preserve the morphology and the sizes of the cells. In one configuration, the CNN was trained six times using a leave-one-out cross-validation strategy. The training was done on five manually traced corneas (150 images) and tested on the sixth cornea (30 images); this procedure was repeated six times leaving out a different cornea for testing each time.

The CNN was trained using manually traced images from corneal samples, wherein post-processing of the identified borders yielded the cell segmentation.

Each pixel of the images in the dataset was annotated as belonging to one out of three classes: cell border, cell interior, and noise. For the training, stochastic gradient descent with a momentum of 0.9 was used, an initial learning rate of 1e-3, an L2 regularization of 5e-4, a mini-batch size of 16 images and a maximum of 400 epochs.

To obtain the segmentation of the cells in the testing step, the raw classification results from the trained network were post-processed as follows: a binary mask was extracted from the pixels classified as cell border. A 2-pixel dilation, to close small gaps in the borders, followed by skeletonization was applied to the binary mask. Regions smaller than 100 square pixels or larger than 750 square pixels were excluded from the segmentation as representing over-segmentation or noisy areas. An example of the fully automated procedure 110 for ECD analysis from the en face view of the flattened endothelium is shown in FIG. 11. The analysis was performed on the central cornea with 0.5 mm diameter to match the manually annotated data available.

As seen in FIG. 11, an automated cell counting procedure 110 is shown. After automatic segmentation of the endothelium and numerical flattening (a) at 111, the region with 0.5 mm diameter in the center of the cornea is selected for analysis and cropped (b) at 112, to match the manually annotated data available. The CNN provides automatic segmentation (c) from the image at 113. After skeletonization (d) of the segmented borders at 114, the cell areas can be quantified (e) at 115.

Referring to FIG. 12, an en face view 120 of the endothelium resulting from the present system is shown, wherein the curved surface is numerically flattened and in focus. As seen in this FIG. 12, the present 3D approach provides an artifact-free numerical flattening.

Although described serially, it is understood the process may combine the binarization and the segmentation steps.

The binarization process may inform the surface fitting and vice-versa. (When a binarization step is performed on each B-scan individually, it may not exploit morphological prior information (smoothness and expected curvature of the surface). Such a binarization step may not succeed, especially near the border, where there may be a poor signal-to-noise ratio. Failed binarization at the edges is normally considered as outliers by the RANSAC algorithm.

Referring to FIG. 13, representative images are shown of an ex vivo human cornea (field of view 1 mm²) imaged through the viewing chamber, wherein (a) is a 3D view at 131; (b) is a full-depth cross-sectional image showing the corneal layers, wherein EP=epithelium, BL=Bowman's Layer, ST=Stroma, DM=Descemet's Membrane, EN=Endothelium at 132. (c) is an en face view of the epithelium at 133, with en face images of the middle (d) at 134 and posterior (e) stroma at 135 reveal stromal keratocytes (white arrows); and (f) is an en face view 136 of the transition between stroma and endothelium, with endothelial cells visible. It is noted the bars FIG. 13 are 100 μm.

Thus, the present system can be employed for imaging processed tissue. For example, the present system allows for (i) imaging of processed tissue before the tissue is placed in any container; (ii) imaging of processed tissue that is in a container such as a Jones tube or loading vial, but outside of a viewing chamber and (iii) imaging of processed tissue that is in a container and in a viewing chamber such as but not limited to a Jones tube and in a viewing chamber, wherein the lid can be in an open position.

FIG. 14 from U.S. Pat. No. 10,041,865 hereby expressly incorporated by reference, shows an exploded view of an assembly or corneal tissue sample assembly 500 for storing, handling, transporting, viewing, evaluating, and/or shipping corneal tissue. FIG. 15 is a perspective view of the assembly 500 in a closed configuration, also from U.S. Pat. No. 10,041,865. As seen in FIGS. 14 and 15, the assembly 500 can include a viewing chamber 510, wherein the viewing chamber 510 includes a body 512 and a lid 518. In some embodiments, the viewing chamber 510 may be a BAUSCH & LOMB™ corneal viewing chamber, a KROLMAN™ viewing chamber, a NUMEDIS INC.™ TRANSEND™ corneal tissue chamber, a STEPHENS INSTRUMENTS™ VISIONPAK™ disposable corneal viewing chamber, derivatives thereof, or another suitable viewing chamber. In various embodiments, the viewing chamber 510 may be formed from a polymer, a glass, or another suitable material. In specific embodiments, the viewing chamber 510 may be formed from a biocompatible material (e.g., a biocompatible polymer, a biocompatible glass, etc.).

The assembly 500 can further include a corneal tissue carrier 520 (also referred to herein as an injector, a Straiko modified Jones tube, a Jones tube, or a tube). The corneal tissue carrier 520 can be removably coupled to an inner portion 513 of the body 512 of the viewing chamber 510. In certain embodiments, the corneal tissue carrier 520 may be a Straiko modified Jones tube, a Jones tube, derivatives thereof, or another suitable tissue carrier. In some embodiments, the corneal tissue carrier 520 may be formed from a polymer, a glass, or another suitable material. In specific embodiments, the corneal tissue carrier 520 may be formed from a biocompatible material (e.g., a biocompatible polymer, a biocompatible glass, etc.).

When the corneal tissue carrier 520 is coupled to the inner portion 513 of the body 512, the lid 518 may be coupled to the body 512. In some embodiments, the lid 518 may not be in contact with the corneal tissue carrier 520 when the lid 518 is coupled to the body 512. In further embodiments, the lid 518 may be in contact the corneal tissue carrier 520, when the lid is coupled to the body 512.

The assembly 500 can further include a corneal tissue sample 555 (also referred to herein as a DMEK graft, a DMEK graft scroll, or a graft). The term scroll encompasses tissue that has been cut, wherein the cut tissue rolls up on itself, giving it an appearance similar to a paper scroll. The scroll can have a single central axis or a pair of axes thereby forming a dual scroll. The corneal tissue sample 555 may be suitable for various forms of keratoplasty or endothelial keratoplasty (e.g., DMEK, PDEK, DSAEK, Ultra-thin DSAEK, etc.). In some embodiments, the corneal tissue sample 555 may be a graft comprising corneal endothelium and Descemet membrane. In some other embodiments, the corneal tissue sample 555 may include corneal endothelium, Descemet membrane, and/or pre-Descemet's membrane. In particular embodiments, the corneal tissue sample 555 may be a DMEK graft or a graft suitable for a DMEK procedure. In alternative embodiments, the corneal tissue sample 555 may also include stroma. In certain embodiments, the thickness of the corneal tissue sample 555 may be less than about 200 microns, less than about 150 microns, less than about 100 microns, less than about 50 microns, less than about 25 microns, less than about 10 microns, or another suitable thickness. In particular embodiments, the thickness of the corneal tissue sample 555 is less than about 100 microns. In specific embodiments, the thickness of the corneal tissue sample 555 is less than about 50 microns. As shown, the corneal tissue sample 555 may be disposed within the corneal tissue carrier 520. In certain embodiments, the corneal tissue sample 555 may be stained before being disposed within the corneal tissue carrier 520. In certain other embodiments, the corneal tissue sample 555 may be disposed within the corneal tissue carrier 520 and then stained. For example, the corneal tissue sample 555 may be stained with Trypan blue, a mixture comprising Trypan blue, a biocompatible stain, or another suitable dye or stain.

The present non-contact GDOCM imaging provides for imaging of the tissue 555 within the tissue carrier 520.

As the eye banking industry is trending towards processing tissue, the present system can be used to image a scroll of graft tissue 555, such as but not limited to DMEK (Descemet Membrane Endothelial Keratoplasty) which is rolled in a Jones tube 160, as shown in FIG. 16. It is further contemplated the tissue can be in a dual scroll configuration as in FIG. 17, with a first scroll 172 and a second scroll 174. In FIG. 18, two adjacent 3D images were montaged to cover the full width of the scroll 172, 174, which was approximately 1.2 mm. The resulting images 120 from the present system are shown in FIG. 19. Thus, the present apparatus and methods may provide imaging of processed tissue with cellular resolution after the tissue has been loaded into (and stored in) a tissue container such as but not limited to a Straiko modified Jones tube or the like. The imaging of the present system can be employed for tissue of various ages, wherein cells of even relatively old tissue, between 5 weeks and 6 weeks, are clearly visible in the GDOCM images as shown in FIGS. 18 and 19.

The present disclosure thus provides for non-contact imaging of corneal tissue stored in a viewing chamber using GDOCM, wherein a 3D numerical flattening procedure is applied to the image data to produce an artifact-free en face view of the endothelium. Thus, curved (or nonplanar) sections of tissue can be imaged, processed and presented as a planar 2D image. It is contemplated the curved sections of tissue can include a single scroll, a double scroll or more of the tissue.

As set forth above, current practices are for eye bank technicians to manually select 50-100 cells within a much larger analysis area of 0.12 mm². The cells within that area but not included in the manual selection do not contribute to the ECD estimation, thus, the effective field of view used by specular microscopy is even smaller than the 0.12 mm² analysis area. Additionally, manual selection of cells for ECD estimation from spectral microscopy images also suffers from selection bias (i.e., the operator usually selects the cells that look the healthiest) and inter-operator variability, with the consequence that results are not reproducible between different eye banks. The present approach using GDOCM has the potential to count ~1,500-3,000 cells in 1 mm² (15-60× improvement over the current practice), and eliminate selection bias. Specifically, as seen in FIG. 20, endothelium of a corneal graft imaged with (a) specular microscopy over a 0.12 mm² field of view (red box) at 202 and with (b) GDOCM over a 1 mm² field of view (8.3× larger, green box) at 204.

Thus, the present system provides for the functioning of three prior separate instruments, specifically (i) thickness measurement—replacing ultrasound or OCT; (ii) Endothelial cell assessment—replacing specular microscopy and (iii) 3D imaging of the cornea over its full thickness with cellular resolution—replacing slit lamp biomicroscopy.

The capability to image the cornea in 3D over its full thickness with micrometer-scale resolution allows for accurate measurement of thickness, and evaluation of stromal opacities. This can be applied to investigating corneas affected by microbes (acanthamoeba and fungal elements), corneal nerves, corneal dystrophies (epithelial, stromal and endothelial), scars, incisions, and Descemet's membrane detachments. In eye banking, it can be useful for pre- and post-processing comparisons. In addition to the 3D imaging capability with cellular resolution, GDOCM has the major advantage of a large field of view of 1×1 mm², which is 4-10× larger than the capability of commercial specular microscopes commonly used at eye banks, as set forth below.

| | Company | | | |
|---|---|---|---|---|
| | HAI Laboratories | Konan | Topcon | LightTopTech |
| Model | EB-3000xyz | CellChek D+ | SP-1P | GDOCM 4D ™ |
| Technology | SM | SM | SM | GDOCM |
| Analysis area | 0.225 mm₂ (450 μm × 500 μm) | 0.12 mm₂ (400 μm × 300 μm) | 0.1375 mm₂ (250 μm × 550 μm) | 1 mm₂ (1 mm × 1 mm) |

By virtue of the non-contact imaging, the corneal tissue may be stored in a PMMA viewing chamber in a preserving medium (e.g., Optisol-GS or Life4° C.) and refrigerated. It can also be stored in a bioreactor or in an active storage machine. The present apparatus and methods may include produce cellular-resolution 3D images over the full thickness of the cornea noninvasively imaging through the viewing chamber. The present apparatus and methods may include produce cellular-resolution 3D images over the full thickness of the cornea noninvasively imaging through a bioreactor or an active storage machine.

Referring to FIG. 21, panel (a) 210 shows an en face image of a portion of the endothelium comparing a 1 dimension (1D) approach to the present 3 dimension (3D) approach at 212. The 1D approach introduces artifacts 211 that appear as lines creating discontinuities in panel (a) 210, while the present 3D approach shown in panel (b) 212 results in artifact-free flattening. Generally, the artifacts are an error in the perception or representation of the tissue, introduced by the equipment or the processing including numerical processing. In the present system, artifacts can appear as lines creating discontinuities in the image, and may additionally cause discontinuities in contrast across the image. The resulting patterns, artifacts, may make delineation of the cells more difficult due to uncertainly in the cell boundaries. In the present system, artifact free is provided by a sufficiently low number of artifacts or magnitude of artifacts that cell boundaries are identified without inducing material uncertainty in the delineation of the cells. In one configuration, an error in cell boundaries, and hence cell number is less than 10%, and in a further configuration less than 5%, and in further configurations less than 3%.

While the description has been set forth in terms of non-contact imaging, it is understood the same numerical processing can be applied and the same beneficial results obtained for image data, including three dimensional image data, from contact imaging. That is, the same numerical flattening and displaying of an artifact free en face image can be provided from contact imaging, such as by the GDOCM, wherein the tissue can be planar or curved including scrolled.

Further while the description has been set forth in terms of three dimensional (3D) image data from GDOCM, it is understood the present numerical flattening and displaying of an artifact free en face image can be applied to 3D image data from any source, such as but not limited to confocal microscopy.

While the 1D approach can result in artifacts 211 (as shown in 210 of FIG. 21) due to mismatch between adjacent points, the present 3D approach results in an artifact-free en face view of the endothelium, as shown in 212 of FIG. 21.

This disclosure has been described in detail with particular reference to an embodiment, but it will be understood that variations and modifications can be affected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A method of imaging a tissue sample, the method of comprising:
    (a) imaging a portion of the tissue sample to create image data;
    (b) applying a low pass filter to the image data to create a first filtered data;
    (c) thresholding the first filtered data to create thresholded data;
    (d) median filtering the thresholded data to reduce thresholding artifacts;
    (e) automatically identifying target cell structures through iterative machine processing to reduce outliers to define a fitted surface; and (f) adjusting an intensity projection of a slice adjacent the fitted surface to accommodate errors introduced by at least one of (i) the thresholding and (ii) median filtering to provide substantially artifact free en face view of the portion of the tissue sample.

2. The method of claim 1, wherein the imaging includes imaging with Gabor-domain optical coherence microscopy (GDOCM).

3. The method of claim 1, wherein applying a low pass filter to the image data includes applying a Gaussian blur to the image data.

4. The method of claim 1, wherein the thresholding includes applying a binarization to the first filtered data.

5. The method of claim 4, wherein the binarization is a Huang binarization.

6. The method of claim 1, wherein the thresholding provides a bimodal acquired volume.

7. The method of claim 1, wherein the iterative machine processing automatic identifying of target cells includes random sample consensus (RANSAC).

8. The method of claim 1, further comprising applying a machine learning algorithm to the en face view.

9. The method of claim 1, wherein the slice is below the fitted surface.

10. The method of claim 1, wherein the portion of the tissue is curved.

11. The method of claim 1, wherein the portion of the tissue is a scroll.

12. The method of claim 1, wherein imaging the portion of the tissue sample to create the image data includes non-contact imaging the portion of the tissue sample to create image data.

13. The method of claim 1, wherein the image data is three dimensional (3D) image data.

14. A method of imaging a tissue sample, the method of comprising:
(a) imaging a portion of the tissue sample with Gabor-domain optical coherence microscopy (GDOCM) to create image data;
(b) numerically flattening the image data; and
(c) displaying an artifact free en face image of the curved portion of the tissue.

15. The method of claim 14, wherein numerically flattening includes applying a low pass filter to the image data to create a first filtered data, thresholding the first filtered data to create thresholded data, median filtering the thresholded data to reduce thresholding artifacts, automatically identifying target cell structures through iterative machine processing to reduce outliers to define a fitted surface and adjusting an intensity projection of a slice adjacent the fitted surface.

16. The method of claim 14, further comprising counting cells in the en face image.

17. The method of claim 14, wherein imaging a portion of the tissue sample includes non-contact imaging a curved area of the portion of the tissue sample.

18. An apparatus for imaging a tissue sample, the apparatus comprising:
(a) a Gabor-domain optical coherence microscope (GDOCM) imaging of a portion of the tissue sample; and
(b) a processor connected to the GDOCM, the processor configured to (i) apply a low pass filter to the image data to create a first filtered data; (ii) threshold the first filtered data to create thresholded data; (iii) median filtering the thresholded data to reduce thresholding artifacts; (iv) automatically identify target structures through iterative machine processing to reduce outliers to define a fitted surface; and (v) adjust an intensity projection of a slice adjacent the fitted surface to accommodate errors introduced by at least one of (aa) the image thresholding and (bb) median filtering to provide a substantially artifact free en face view of the portion of the tissue.

19. The method of claim 18, wherein the Gabor-domain optical coherence microscope has a working distance that is greater than 0.0 mm for non-contact imaging the portion of the tissue sample.

20. A method of assessing tissue graft efficacy, the method comprising:
(a) in vivo imaging a grafted tissue with a Gabor-domain optical coherence microscope;
(b) applying a low pass filter to the image data to create a first filtered data;
(c) thresholding the first filtered data to create thresholded data;
(d) median filtering the thresholded data to reduce thresholding artifacts;
(e) automatically identifying target cells through iterative machine processing to reduce outliers to define a fitted surface; and
(f) adjusting an intensity projection of a slice adjacent the fitted surface to accommodate errors introduced by at least one of (aa) the image thresholding and (bb) median filtering to provide a substantially artifact free en face view of the grafter tissue.

21. The method of claim 20, wherein the in vivo imaging includes non-contact imaging the grafted tissue.

* * * * *